United States Patent [19]
White

[11] Patent Number: 5,228,703
[45] Date of Patent: Jul. 20, 1993

[54] SEALING MEMBER

[76] Inventor: Ronald White, 6931 Rushleigh Rd., Englewood, Ohio 45322-3727

[21] Appl. No.: 836,688

[22] Filed: Feb. 18, 1992

[51] Int. Cl.⁵ ............................................. F16J 15/10
[52] U.S. Cl. .................................... 277/212 C; 277/9; 62/51.1; 250/352
[58] Field of Search .......... 277/9, 186, 212 C, 212 R, 277/212 F; 62/51.1, 51.2; 250/352

[56] References Cited

U.S. PATENT DOCUMENTS

| | | | |
|---|---|---|---|
| 1,320,675 | 11/1919 | Christenson | 277/212 C |
| 1,767,936 | 6/1930 | McElroy et al. | 277/212 C |
| 3,326,015 | 6/1967 | Webster | 62/51.2 |
| 3,942,010 | 3/1976 | Peterson et al. | 250/352 |
| 3,951,418 | 4/1976 | Dryer . | |
| 4,017,959 | 4/1977 | Fletcher et al. | 29/447 |
| 4,192,519 | 3/1980 | Buggele . | |
| 4,344,302 | 8/1982 | Jarrett, Jr. et al. | 62/51.1 |
| 4,462,214 | 7/1984 | Ito | 62/51.1 |
| 4,472,468 | 9/1984 | Tailor et al. | 156/308.4 X |
| 4,491,347 | 1/1985 | Gustafson . | |
| 4,501,108 | 2/1985 | Johansson . | |
| 4,547,948 | 10/1985 | Abplanalp | 29/450 X |
| 4,772,050 | 8/1988 | Buehler et al. . | |
| 4,886,240 | 12/1989 | Rich | 250/352 |
| 4,918,312 | 4/1990 | Wellman et al. | 62/51.1 X |

Primary Examiner—William A. Cuchlinski, Jr.
Assistant Examiner—Scott W. Cummings
Attorney, Agent, or Firm—Edward W. Nypaver; Thomas L. Kundert

[57] ABSTRACT

An extremely thin, conically shaped sealing member is interposed between the cooling element of a cryocooler and a dewar to permit the flow of cryogenic gases in one direction toward the cold end of the cooling element where the gas liquifies and is precluded from passing past the sealing member in an opposite direction so as to maintain the cryogenic liquid at such cooling element cold end when subjected to extreme acceleration forces. The sealing member can be formed in place directly onto the cooling element or separately fabricated from flat stock and subsequently fixedly secured to the cooling element.

6 Claims, 3 Drawing Sheets

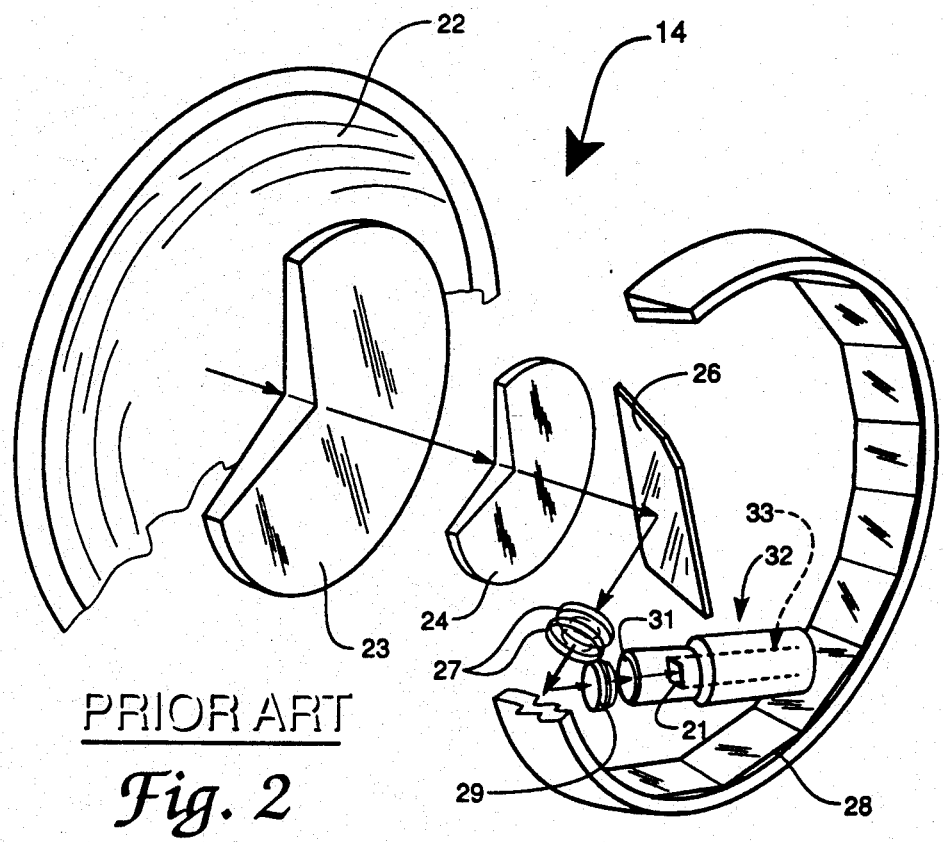
PRIOR ART
Fig. 2
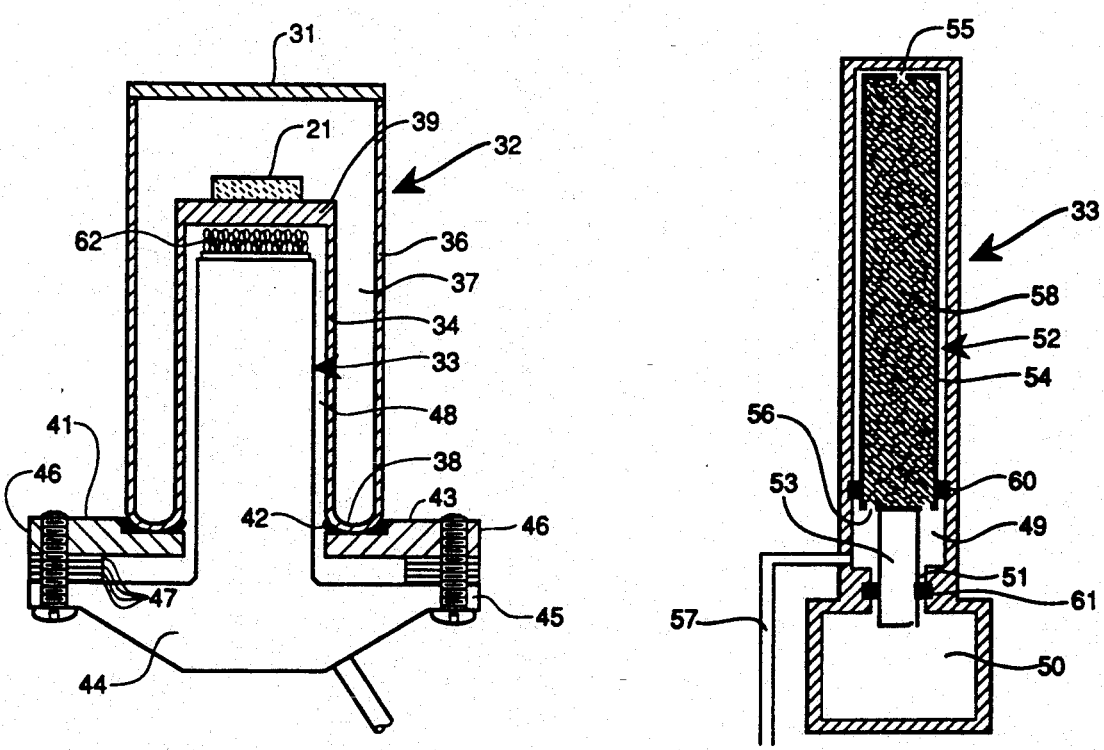
PRIOR ART
Fig. 3
PRIOR ART
Fig. 4

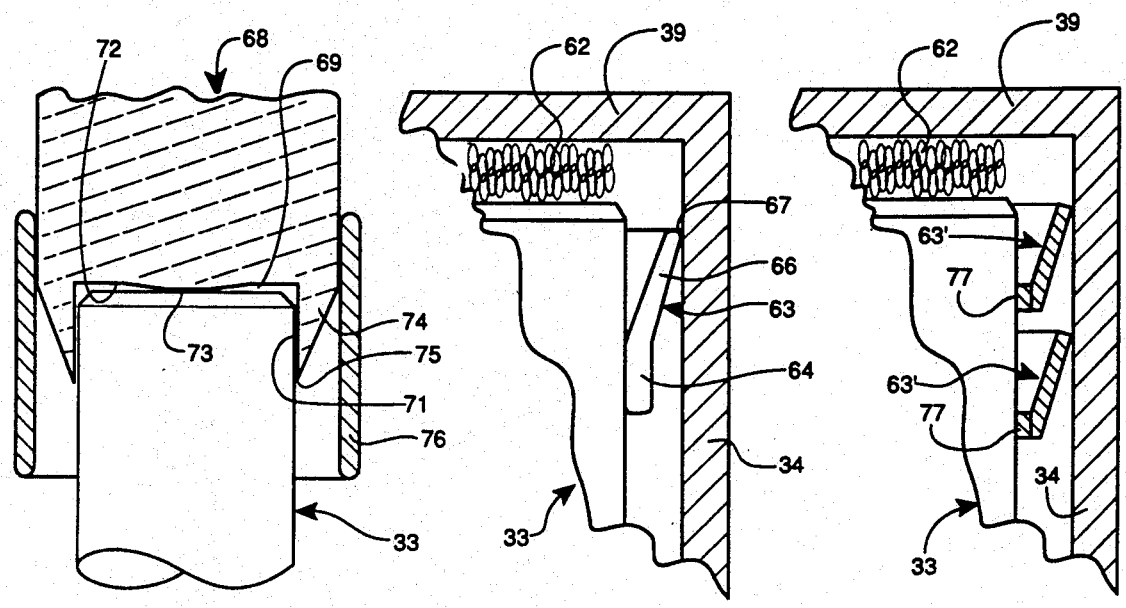
*Fig. 6*  *Fig. 5*  *Fig. 8*
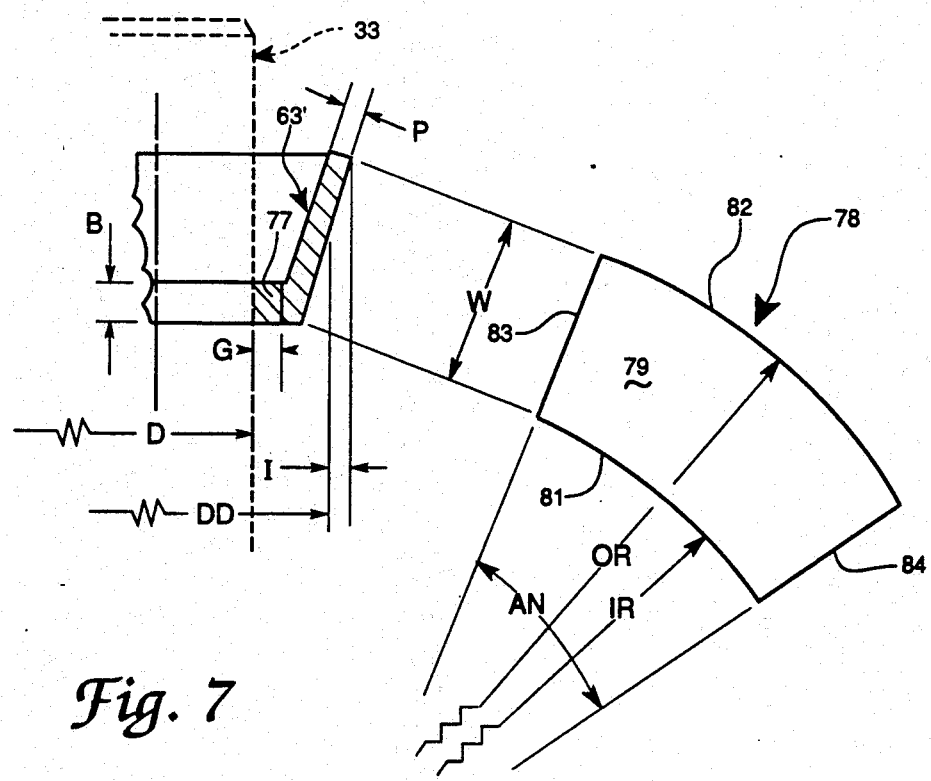
*Fig. 7*

SEALING MEMBER

RIGHTS OF THE GOVERNMENT

The invention described herein may be manufactured and used by or for the Government of the United States for all governmental purposes without the payment of any royalty.

BACKGROUND OF THE INVENTION

This invention relates generally to a sealing member and the method of fabricating the same and, more particularly, to a sealing member employed in cryogenic atmospheres to prevent leakage of flowable cryogenic fluids.

While the sealing member of this invention will conveniently be described in connection with the cooling system employed to maintain an imaging infrared detector at cryogenic temperatures in an autonomously guided missile, it should be appreciated that the sealing member of this invention is in no way restricted to such usage, but has utility in a wide variety of applications where it is desirable to trap or otherwise preclude leakage of fluids ranging from room temperatures to cryogenic temperatures.

Certain missiles utilize imaging infrared (IR) guidance to provide a day or night capability under a wide variety of target conditions. The infrared detector is effective to form a display image by sensing the differences in infrared heat radiated by objects in view for homing in on selected targets. In order to perform satisfactorily, the detector which is mounted in a dewar, must be maintained at cryogenic temperatures in order to properly sense minute differences in temperature. The component relied upon to transmit extreme low temperatures is a cryocooler expander element commonly referred to as a "cold finger". The cold finger is cylindrical in shape and is closely fitted within the double-walled dewar surrounding the cold finger. These components are very small, the cold finger diameter ranging between about 0.194 to 0.196 inches and the inside diameter of the dewar ranging from about 0.2005 to 0.2023 inches, leaving a gap therebetween of approximately 0.0055 to 0.00725 inches, depending on the exact dimensions of the acceptable tolerances between these components. This small gap is exposed to the ambient atmosphere consisting of a suitable cryogenic gas, such as nitrogen for example, which liquifies at a given Kelvin temperature as the cold finger cools. The resultant liquid nitrogen resides between the distal or cold end of the cold finger and the bight portion of the dewar section in which the detector is mounted providing improved conduction and cooling therebetween.

A serious problem resides in maintaining the liquid nitrogen in place during the extreme acceleration forces encountered when the missile is launched. Leakage of the liquid nitrogen through the gap from the area adjacent the dewar detector interface destroys the thermal conduction effective thereon to raise the temperature of the detector and causes it to go blind.

One approach in solving this problem was to fill the dewar/cold finger gap with plastic tape. The installation procedure included stretching the tape before application to reduce its thickness and then applying it over the last one third of the cold end of the finger. The cold finger was then inserted into the dewar, allowing the tape to relax and expand in thickness to fill the gap. However, it was found that the plastic tape became very hard at cryogenic temperatures, creating a rigid interface resulting in binding and the transmission of undesirable forces between the cold finger and the dewar.

SUMMARY OF THE INVENTION

Accordingly, it is a primary object of the present invention to avoid the shortcomings noted above by providing an improved sealing member for precluding leakage of flowable cryogenic fluids.

It is another object of this invention to provide an improved method for forming a sealing member directly onto a cooling member employed in cryogenic atmospheres.

It is still another object of the present invention to provide the foregoing sealing member with a thin, conically shaped configuration permitting fluid flow in one direction but preventing fluid flow in the opposite direction.

It is a further object of this invention to provide an improved sealing member formed of a material capable of withstanding extreme cryogenic temperatures while maintaining radial flexibility to provide requisite sealing pressure.

The present invention is characterized by an extremely thin, conically shaped sealing member interposed between the cooling element of a cryocooler and a dewar to permit the flow of cryogenic fluids in one direction but prevent flow in the opposite direction to retain such cryogenic fluids at the cold end of said cooling element when subjected to extreme acceleration forces. The sealing member can be formed in place directly onto the cooling element or separately fabricated and subsequently fixedly secured to the cooling element.

BRIEF DESCRIPTION OF THE DRAWING FIGURES

FIG. 2 is an exploded view of the optics system housed in the missile of FIG. 1;

FIG. 3 is a longitudinal sectional view of the prior art cooling element and dewar arrangement employed to maintain an infrared detector at desired temperatures;

FIG. 4 is a longitudinal sectional view of the cooling element depicted in FIG. 3;

FIG. 5 is a fragmentary sectional view showing the sealing member of the present invention between the cooling element and dewar;

FIG. 6 is a fragmentary longitudinal sectional view illustrating the tool employed to fabricate one form of sealing member of this invention;

FIG. 7 is a fragmentary sectional view of another form of sealing member of this invention and illustrating the blank from which said sealing member is formed; and FIG. 8 is a fragmentary sectional view showing a pair of axially spaced sealing members of the form depicted in FIG. 7 in use between the cooling element and dewar.

DETAILED DESCRIPTION OF AN ILLUSTRATIVE EMBODIMENT

Figure 1:
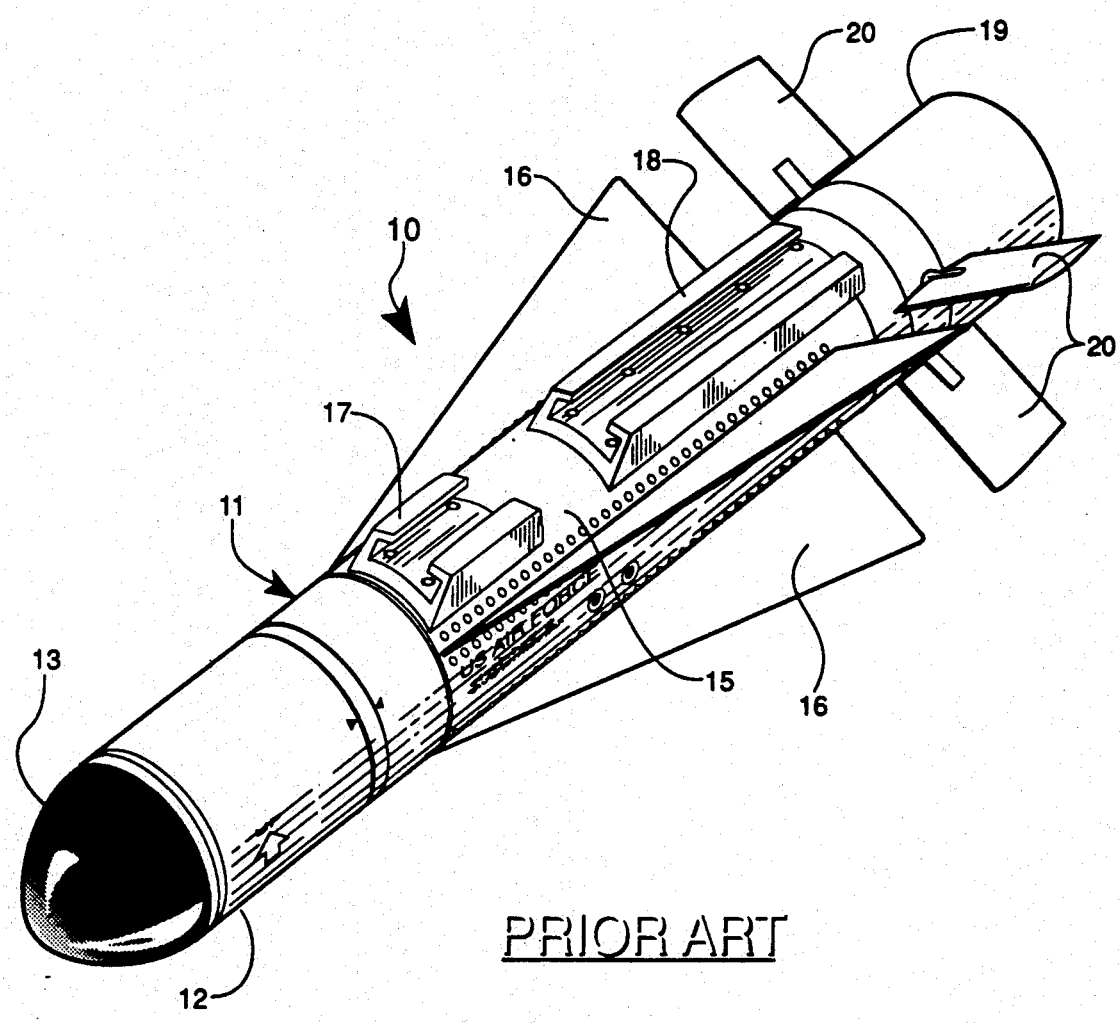
FIG. 1 is a perspective view of a missile embodying the novel sealing member of this invention.

Referring now in detail to the illustrative embodiment depicted in the accompanying drawings, there is shown in FIG. 1 a conventional missile, comprehensively designated 10, embodying a novel sealing arrangement of this invention which will hereinafter be fully described in detail. The missile 10 comprises a generally cylindrical casing 11 having a nose section 12 with a forward end transparency 13 housing the optics system, generally designated 14 (FIG. 2), a central section 15 containing the blast warhead and rocket motor (not shown) and provided with laterally projecting fins 16 and channel members 17 and 18 for attachment to the launching pad of an aircraft, for example. The casing 11 terminates in an aft section 19 provided with radially extending flight control surfaces 20.

The missile 10 utilizes imaging infrared (IR) guidance to offer day, night and adverse weather attack capability. The missile's IR seeker or detector array 21 (FIG. 2) senses minute differences in temperature such as between a target and its background to produce an image on the cockpit display. In order to function properly in sensing miniscule temperature variations, the detector array 21 must be maintained at cryogenic temperatures. The incoming radiation path taken by the thermal scene passes through the optic system 14 onto the detector array 21 as described below.

The IR energy from the target and background first passes through the opaque guidance unit window 22 of the optics system 14. This window, formed of a special material such as zinc sulphide sold under the trade name IRTRAN-4, allows energy to pass therethrough undistorted and is the first of a series of lenses forming a part of the optics system 14. After passing through window 22, the IR energy reflecting the thermal scene passes through a pair of differently sized, successive, telescopic lenses 23 and 24 and is reflected by a folding interlace mirror 26 for passage through dual Field-Of-View (FOV) lenses 27. The IR energy passing through lenses 27 is reflected by a rotatable, multifaceted, scan mirror 28 through viewing lenses 29, an optical window 31 formed at one end of a dewar, generally designated 32, and onto the detector array 21 mounted within the dewar 32. The dewar 32 encompasses a crycooler element, hereinafter referred to as "cold finger" 33 and the location of the detector array 21 within dewar 32 lies in close proximity to the upper or cold end of the finger 33.

Referring to FIG. 3, the dewar 32 preferably is composed of glass having a double wall configuration including an inner side wall 34 and a radially spaced outer side wall 36 defining an evacuated space 37 therebetween. The inner and outer side walls 34 and 36 are integrally joined together at their lower ends by a bottom wall 38. The upper end of inner side wall 34 is integrally joined to a top wall 39 on which the detector array 21 is mounted. The outer side wall 36 extends upwardly beyond the inner side wall 34 and is capped by the optical window 31 disposed in spaced relation to top wall 39 to complete the fluid tight enclosure defining the thermal insulating, inverted U-shaped evacuated space 37. As used herein, the terms top, bottom, upper, lower, vertical, horizontal and the like are applied only for convenience of description with reference to FIGS. 3-9, it being understood that the orientation of the dewar 32 and associated structure in use may vary as required.

The lower end of dewar 32 is fixedly secured to a metal base member 41 and is provided with concentric inner and outer glass-to-metal, elastomeric seals 42 and 43 to provide fluid tight sealing between the dewar 32 and base member 41. The cold finger 33 is formed with a base 44 having a radial flange 45 detachably secured, as by fasteners 46, to the dewar base member 41. A series of shims 47 can be interposed between base member 41 and flange 45 to obtain the desired vertical spacing between the cold finger 33 and detector array 21.

It should be appreciated that the radial space or gap, designated 48 in FIG. 3, between the inner wall of dewar 32 and the outer wall of cold finger 33 can range from 0.0055 to 0.00725 inches as dictated by the acceptable tolerances of the mating parts. This gap 48 is exposed to the ambient atmosphere encompassing the electronics located in the nose section 12. While vapor free nitrogen gas is preferable to protect such electronics, any suitable gas, including air, can be used so long as it can be liquified at the desired cryogenic temperatures.

FIG. 4 illustrates schematically the internal construction of the cold finger 33 which includes an elongated chamber 49 connected to a lower chamber 50 via passage 51 of reduced cross sectional area. An elongated displacer 52 is located within chamber 49 for reciprocating movement therewithin and is formed with a drive piston 53 extending through passage 51 into lower chamber 50. The displacer 52 is formed with a housing 54 provided with an upper port 55 and a lower port 56 communicating with the chamber 49, the latter, in turn, connected by conduit 57 to a compressor (not shown). The housing 54 contains a low thermal conductivity filler, such as a stainless steel or fiberglass matrix for example, which serves as and will be hereinafter referred to as a thermal regenerator 58. A suitable annular seal 60 is provided between displacer 52 and the inner wall of the cold finger 33. Similarly, a suitable annular seal 61 is disposed between the drive piston 53 and the inner wall defining passage 51.

In operation and with the displacer 52 in its upper position in close proximity to the upper or cold end of finger 33, a suitable gas, such as helium for example, is delivered from the compressor to the cold end of finger 33 via conduit 57, chamber 49, port 56, thermal regenerator 58, and port 55 to the top side of displacer 52. As pressure builds up and the force acting on the top end of displacer 52 becomes greater than the force acting on the underside thereof, the displacer 52 shifts downwardly to its lowermost position. As the high pressure gas passes upwardly through the displacer 52, it gives up heat to the regenerator 58 to provide cold high pressure gas at the top of the cold finger 33. During the next compressor sequence, the gas is expanded resulting in a cold low pressure gas creating a differential pressure to shift the displacer 52 upwardly toward the elevated position shown in FIG. 4. The cold low pressure gas passing downwardly through the displacer 52 picks up heat from the thermal regenerator 58 and exits through port 56 and conduit 57 back to the compressor. This cycle is continuously repeated to maintain the upper portion of the cold finger 33 at cryogenic temperatures.

The ambient gas, nitrogen for example, provided in the upper end of gap 48 (FIG. 3) adjacent dewar wall 39 liquifies when the cryogenic gas reaches 77 degrees Kelvin. This reduces the pressure at the top of gap 48 creating a vacuum which draws more nitrogen into the gap 48 to be liquified. A gauze-like, loosely woven metal filament, hereinafter referred to as a "fuzz button" 62, is mounted on the top of the cold end of finger 33 and is saturated with liquid nitrogen to provide improved heat conduction between the cold finger 33 and dewar 32 and reserve cooling capacity. Such an arrangement maintains the detector array 21 in the dewar 32 at desired cryogenic temperatures for optimum infrared sensing.

Early cold finger dewar designs provided a close fit therebetween. However, sudden acceleration forces, such as occur during launching or firing of a missile etc., causes the liquid nitrogen to leave the cold end of finger 33. This reduces the thermal conduction otherwise offered by the liquid nitrogen, allowing the infrared detector array to warm-up and become disabled or blind thereby aborting its capability of sensing/imaging the thermal scene, such as a target zone, for example.

In order to obviate this problem and preclude leakage of the liquid nitrogen away from the cold end of the finger 33, and in accordance with this invention, a very thin, annular, flexible sealing member 63 (FIG. 5) is interposed between the cold finger 33 and dewar 32 for permitting some relative radial or lateral movement therebetween. The flexible sealing member 63 acts as a check valve in allowing the nitrogen gas/liquid to pass therethrough to the upper end of cold finger 33 but prevents the liquid nitrogen from seeping back from said cold end to retain the liquid nitrogen in place under extreme acceleration forces.

The sealing member 63 is formed from thin, plastic shrink tubing having a thickness from about 0.0012 inches to 0.0018 inches. Preferably, the sealing member 63 is formed of HEAT-SHRINKABLE TEFLON TFE SUB-LITE-WALL TUBING, AWG Size No. 8, available from Zens Industrial Products, Inc. of Raratin, N.J. This material has a wall thickness of approximately 0.0012 inches before shrinking. After shrinking to the seal configuration, the tubing will have a wall thickness of 0.0015 inches at the outer diameter and 0.0018 inches at the cold finger. With the size of the radial gap 48 ranging from 0.0055 to 0.00725 inches, the above wall thicknesses will allow 0.0037 to 0.00545 inches of radial movement between the cold finger 33 and the dewar 32 while sealing the liquid nitrogen and without transmitting significant forces. While the Teflon TFE plastic material disclosed above is preferable, it should be understood that any suitable plastic shrink tubing material, such as PVC or Polyester for example, having adequate strength and flexibility at cryogenic temperatures, can be used in lieu thereof.

As shown in FIG. 5, the sealing member 63 is provided with an annular portion 64 shrink fitted about the outer wall of cold finger 33 and an integral body portion 66 extending from the upper end of annular portion 64 upwardly and radially outwardly in a divergent attitude and terminating in an annular sealing lip 67 engagable with the inner surface of the dewar inner side wall 34.

In operation, the ambient cryogenic fluid, such as nitrogen gas for example, under pressure entering gap 34 slightly moves the flexible, thin body portion 66 of sealing member 63 radially inwardly allowing the gas to pass by the sealing lip 67 onto the upper or cold end of finger 33. The nitrogen gas is further cooled by conduction via such finger cold end and fuzz button 62 and liquifies at approximately 77° Kelvin, saturating the fuzz button 62 with liquid nitrogen. This liquification of the gas creates a vacuum drawing more gas into the area above the cold end of finger 33 which liquifies to maintain via conduction the detector array 21 at the desired temperature. Upon sudden acceleration forces, as might occur on launching of the missile 10, the tendency of the liquid nitrogen to flow away from the top of the cold finger 33 acts against the body portion 66 of sealing member 63 to urge the sealing lip 67 into firmer pressure sealing engagement against the inner surface of dewar inner wall 34, providing an interference fit therebetween. The sealing engagement of lip 67 against such surface of the inner wall 34, caused by the interference fit therebetween, is augmented by the force of the liquid acting thereagainst.

The preferred mode of fabricating the conically configurated sealing member 63 is to form it in place directly onto the cold finger 33. As shown in FIG. 6, a shim tool 68 is utilized in this effort, the tool 68 having a cavity 69 formed in the distal end thereof. The cavity 69 is defined by an annular wall 71 fitted about the periphery of the cold finger 33 and an interior wall 72 provided with a central protrusion 73 engagable with the top end of cold finger 33 to properly position the tool 68 relative to finger 33. The tool 68 terminates in a tapered end portion 74 defining an annular tip 75 in close proximity to the periphery of cold finger 33. The unshrunk plastic tubing 76 is wrapped about a portion of the cold finger 33 and about the tool tapered end portion 74 and then quickly heated to shrink the plastic tubing over the cold finger 33 and the tapered portion 74 of shim tool 68. After the plastic cools, it is trimmed with a knife or other suitable severing tool to the proper diameter as determined by suitable indicia or markings (not shown) on the peripheral surface of tapered end portion 74. The remaining product constitutes the flared or conically configurated sealing member 63 disposed about the cold finger 33.

FIGS. 7 and 8 illustrate another mode of fabricating a thin flexible sealing member, generally designated 63', from a thin band of adhesive or tape 77 and a fan shaped strip of plastic 78. The tape 77 is preferably fabricated from 3M double sticky tape number 3300 which is approximately 0.003 inches thick. A band of this tape 77 about 0.062 inches wide is placed around the cold finger 33 and trimmed so that the ends butt together.

The fan shaped strip of plastic 78 preferably is cut from a flat sheet stock of plastic, preferably such as that sold under the trademark "MYLAR", having a thickness of about 0.001 inches. As shown in FIG. 7, the fan shaped plastic strip 78 is defined by a body portion 79 having an inner arcuate edge 81, an outer arcuate edge 82 of longer length than said inner arcuate edge 81, and a pair of end edges 83 and 84. The strip 78 is cut to size by the following formulas:

$$IR = \frac{(D + (2 \times G)) \times (IR + W)}{DD + (2 \times I) - (2 \times P)};$$

$$OR = IR + W$$

$$AN \text{ (degrees)} = \frac{180 \times (D + (2 \times G))}{IR};$$

where
$D$ = cold finger diameter
$G$ = adhesive thickness
$P$ = plastic thickness
$W$ = plastic width
$I$ = radial interference between the seal lip and the dewar ID (if desired for tighter sealing)
$IR$ = inner radius to be cut from sheet plastic
$OR$ = outer radius to be cut from sheet plastic
$AN$ = included angle between the end edges to be cut from sheet plastic
$DD$ = dewar inside diameter
$B$ = adhesive width After having cut the plastic strip 78 to size in accordance with the aforementioned formulas, the inner arcuate edge 81 is bonded to the outer surface of the double sticky tape 77 bringing the end edges 83 and 84 together to form the flared or conically shaped sealing member 63'. Since the sealing member 63' will have a narrow gap at the abutting end edges 83 and 84, a second sealing member 63' in axially spaced relation to the first is secured to the cold finger 33 with its butt joints or gap offset 180 degrees from the first sealing member gap.

It should be noted that the several dimensions of the sealing member 63,63' and the spacing between the cold finger 33 and the dewar 10 recited herein are only exemplary in nature, demonstrating the smallness of the components and spacings involved and are not intended to circumscribe the size and/or dimension limits of the dewar/cold finger to which the sealing member 63 of the instant invention may be applied. Rather, the sealing members of the instant invention can vary in dimension for utility in gaps or openings of significantly larger sizes within the purview of the invention.

From the foregoing, it is apparent that the present invention fully accomplishes its intended objects. As a result of this invention, a new and improved sealing member is provided for effectively retaining cryogenic fluids trapped in a manner maintaining an infrared detector at desired, operative temperatures. By forming the sealing member from thin, flexible, plastic material unaffected by extreme cryogenic temperatures in a conical configuration, the sealing member is effective to permit fluid flow in one direction while preventing fluid flow in the opposite direction.

It is to be understood that the forms of the invention herewith shown and described are to be taken as illustrative embodiments only of the same, and that minor changes in the shape, dimensions, size and arrangement of parts, as well as various procedural changes, may be resorted to without departing from the spirit and scope of the invention.

After having cut the plastic strip 78 to size in accordance with the aforementioned formulas, the inner arcuate edge 81 is bonded to the outer surface of the double sticky tape 77 bringing the end edges 83 and 84 together to form the flared or conically shaped sealing member 63'. Since the sealing member 63' will have a narrow gap at the abutting end edges 83 and 84, a second sealing member 63' in axially spaced relation to the first is secured to the cold finger 33 with its butt joints or gap offset 180 degrees from the first sealing member gap.

It should be noted that the several dimensions of the sealing member 63,63' and the spacing between the cold finger 33 and the dewar 10 recited herein are only exemplary in nature, demonstrating the smallness of the components and spacings involved and are not intended to circumscribe the size and/or dimension limits of the dewar/cold finger to which the sealing member 63 of the instant invention may be applied. Rather, the sealing members of the instant invention can vary in dimension for utility in gaps or openings of significantly larger sizes within the purview of the invention.

From the foregoing, it is apparent that the present invention fully accomplishes its intended objects. As a result of this invention, a new and improved sealing member is provided for effectively retaining cryogenic fluids trapped in a manner maintaining an infrared detector at desired, operative temperatures. By forming the sealing member from thin, flexible, plastic material unaffected by extreme cryogenic temperatures in a conical configuration, the sealing member is effective to permit fluid flow in one direction while preventing fluid flow in the opposite direction.

It is to be understood that the forms of the invention herewith shown and described are to be taken as illustrative embodiments only of the same, and that minor changes in the shape, dimensions, size and arrangement of parts, as well as various procedural changes, may be resorted to without departing from the spirit and scope of the invention.

I claim:

1. In a cryogenic atmosphere including a cooling element having an outer wall and a dewar having an inner wall portion closely surrounding said cooling element outer wall to define a narrow gap therebetween, the improvement comprising: a flexible sealing member in said gap and interposed between said cooling element outer wall and said dewar inner wall portion, said sealing member having a conical configuration including an inner portion secured to said cooling element outer wall and a body portion extending radially outwardly at an angle toward said dewar inner wall portion and terminating in an annular sealing lip engagable with said dewar inner wall portion.

2. A sealing member according to claim 1, wherein said sealing member is formed of a thin, flexible, heat-shrinkable plastic material fixedly secured along said inner portion onto said cooling element outer wall.

3. A sealing member according to claim 2, wherein said plastic material possesses adequate strength and flexibility at cryogenic temperatures.

4. A sealing member according to claim 1 wherein said sealing member is formed of a material selected from the group consisting of Teflon TFE, PVC, and Polyester.

5. A sealing member according to claim 1 wherein said inner portion comprises a narrow annular strip of double sticky tape adhesively secured to said cooling element outer wall and the inner edge of said body portion adhesively secured to said tape.

6. In a cryogenic atmosphere including a cooling element having an outer wall and a dewar having an inner wall portion closely surrounding said cooling element outer wall to define a narrow gap therebetween, the improvement comprising: a flexible sealing member in said gap and interposed between said cooling element outer wall and said dewar inner wall portion, said sealing member having a conical configuration including an inner portion secured to said cooling element outer wall and a body portion extending radially outwardly at an angle toward said dewar inner wall portion and terminating in an annular sealing lip engagable with said dewar inner wall portion and terminating in an annular sealing lip engagable with said dewar inner wall portion, said body portion having a thickness ranging from approximately 0.0012 inches to 0.0018 inches.

* * * * *

UNITED STATES PATENT AND TRADEMARK OFFICE
CERTIFICATE OF CORRECTION

PATENT NO. : 5,228,703
DATED : July 20, 1993
INVENTOR(S) : Ronald White

It is certified that error appears in the above-identified patent and that said Letters Patent is hereby corrected as shown below:

Column 7, lines 39-63 should be deleted.

Column 8, lines 1-15 should be deleted.

Signed and Sealed this

Eighth Day of March, 1994

*Attest:*

BRUCE LEHMAN

*Attesting Officer*     *Commissioner of Patents and Trademarks*